US005318196A

United States Patent [19]

Cervantes et al.

[11] Patent Number: 5,318,196

[45] Date of Patent: Jun. 7, 1994

[54] COFFEE STIRRER DISPENSER

[76] Inventors: Pat Cervantes, Rte. 2, Box 687, San Antonio, Tex. 78249; Moses Cervantes, 8010 Pebble Dr., New Orleans, La. 70128

[21] Appl. No.: 94,897

[22] Filed: Jul. 22, 1993

[51] Int. Cl.[5] .............................................. B65G 59/06

[52] U.S. Cl. .................................... 221/184; 221/202; 221/256; 221/263; 221/268; 221/274; 221/276

[58] Field of Search ............... 221/183, 184, 187, 191, 221/194, 195, 196, 200, 202, 203, 239, 255, 256, 263, 268, 270, 272, 274, 276

[56] References Cited

U.S. PATENT DOCUMENTS

| | | | |
|---|---|---|---|
| 647,955 | 4/1900 | Fonsskov | 221/274 X |
| 896,390 | 8/1908 | Joyce . | |
| 1,088,912 | 3/1914 | Long | 221/256 |
| 1,102,377 | 7/1914 | Wilton | 221/203 |
| 1,247,225 | 11/1917 | Cloovas . | |
| 1,844,482 | 2/1932 | Schick . | |
| 2,467,799 | 4/1949 | Archer | 312/67 |
| 3,667,650 | 6/1972 | Noda et al. | 221/250 |

FOREIGN PATENT DOCUMENTS

| | | | |
|---|---|---|---|
| 326995 | 3/1930 | United Kingdom | 221/256 X |

*Primary Examiner*—D. Glenn Dayoan
*Assistant Examiner*—Dean A. Reichard
*Attorney, Agent, or Firm*—Jacobson, Price, Holman & Stern

[57] ABSTRACT

A dispenser for containing and dispensing elongated articles such as coffee stirrers is provided and presents an inclined wall therein including upper and lower end portions against and downwardly along which articles to be dispensed rest and may move by gravity. A dispensing member equipped with an upwardly opening groove is reciprocal transversely of the lower end portion of the inclined wall and includes an upper surface along which articles to be dispensed may move from the aforementioned lower end portion into the groove. The dispenser includes a side wall having an opening therein with which one end of the groove is registered and the opposite end of the groove is closed, whereby an article disposed in the groove may be dispensed through the opening upon movement of the dispensing member toward the one side wall of the dispenser. An operating rod is provided to effect oscillation of the dispensing member and to also agitate the articles to be dispensed as they move from the lower end of the inclined wall toward the groove.

13 Claims, 2 Drawing Sheets

COFFEE STIRRER DISPENSER

BACKGROUND OF THE INVENTION

FIELD OF THE INVENTION

This invention relates to an apparatus for containing and individually dispensing a plurality of elongated members such as coffee stirrers.

DESCRIPTION OF RELATED ART

Various different forms of article dispensing assemblies including some of the general structural and operational features of the instant invention heretofore have been provided. Examples of these previously known forms of dispensing apparatuses are disclosed in U.S. Pat. Nos. 896,390, 1,247,225, 1,844,482, 2,467,799 and 3,667,650. However, these previous forms of dispensing apparatuses do not include the overall combination of structural and operational features included in the instant invention.

SUMMARY OF THE INVENTION

The dispenser of the instant invention incorporates a housing defining an internal hopper portion for receiving therein a plurality of elongated articles in parallel relation. The hopper includes a downwardly inclined wall against which and downwardly along which the articles rest and move by gravity toward a lower end portion of the inclined wall with which the upper surface of a transversely shiftable dispensing block is registered and the block includes an upwardly opening groove therein into which the next article to be dispensed may fall by gravity. The housing includes a first side wall toward and away from which the dispensing block is movable and the first wall includes a dispensing opening therein registered with the adjacent end of the aforementioned groove, the remote end of the groove being closed. The forward side of the housing includes a closure wall through which an oscillatable shaft is rotatably received and the dispensing block includes a void therein through which the inner end of the shaft projects with the void opening upwardly through the upper or top surface of the dispensing block intermediate the groove and the lower end portion of the inclined wall. The oscillatable shaft or rod includes a generally right angle arm projecting upwardly therefrom which passes upwardly through the void and slightly above the upper surface of the block when the arm is disposed vertically. The void opens through the upper surface of the block throughout a restricted length thereof and oscillation of the shaft is operative to effect oscillation of the dispensing block toward and away from the first side wall of the housing, the upper terminal end portion of the arm which projects above the upper surface of the dispensing block serving to agitate an elongated article overlying the upper end of the void in order to insure proper parallel relationship of the elongated articles moving from the lower end portion of the elongated wall across the upper surface of the block and into the dispensing groove.

The main object of this invention is to provide a dispenser for elongated articles such as coffee stirrers and with the dispenser constructed in a manner such that it may contain a large quantity of elongated articles to be singly dispensed therefrom and also in a manner such that single dispensing of the elongated articles may be readily carried out without malfunction of the dispenser.

Another object of this invention is to provide an elongated article dispenser in accordance with the preceding object and which includes only two moving parts and which incorporates an operator therefor of simple construction and which may be readily operated by substantially anyone, even those persons having never before seen the dispenser.

Another very important object of this invention is to provide an elongated article dispenser which may be readily modified to dispense various different forms of elongated articles.

Another object of this invention is to provide an elongated article dispenser whose external shape may be varied for aesthetic use in different environments.

A final object of this invention to be specifically enumerated herein is to provide an elongated article dispenser in accordance with the preceding objects and which will conform to conventional forms of manufacture, being of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
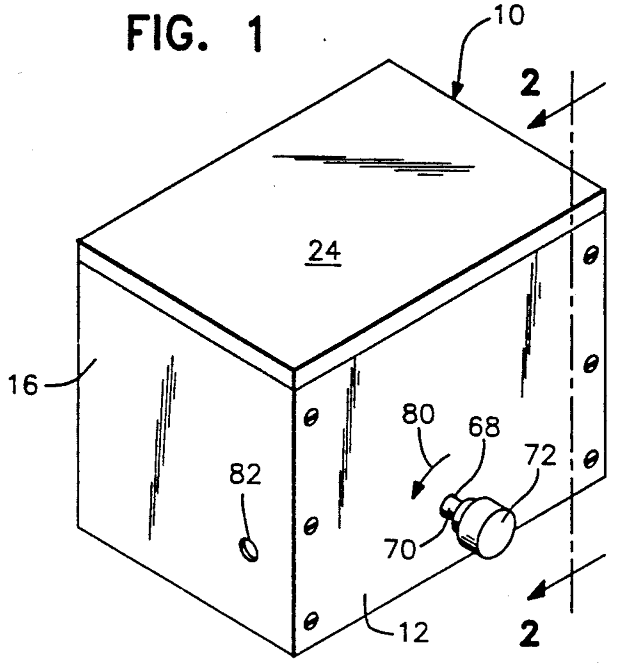
FIG. 1 is a perspective view of an article dispenser constructed in accordance with the present invention.

Referring now more specifically to the drawings the numeral 10 generally designates the dispenser of the instant invention which is illustrated in the form of a rectangular housing, but which may take any ornamental shape, if desired.

The housing 10 includes front and rear walls 12 and 14 interconnected by first and second side walls 16 and 18 and the lower ends of the walls 12, 14, 16 and 18 are interconnected by bottom wall 20 whose peripheral edges are held captive within inwardly opening grooves 22 formed in the lower marginal portions of the walls 12, 14, 16 and 18 in horizontal registry with each other.

The top of the housing 10 is closed by a top wall 24 which may be removably secured to the upper marginal edges of the walls 12, 14, 16 and 18 in any convenient manner (not shown) or which may be hinged to either of the walls 12, 14, 16 and 18, if desired.

The interior of the housing defines an internal hopper portion 26 for receiving therein a plurality of elongated members 28 such as coffee stirrers The hopper portion 26 is defined by an inclined (arcuate) wall 30 having its upper marginal edge 32 anchored to the rear wall 14 in any convenient manner and extending fully between the opposite side walls 16 and 18. The lower end or marginal portion 34 of the inclined wall 30 is anchored within a groove 36 provided therefor and an anchor block 38 supported from the bottom wall 20 and extending thereacross between the side walls 16 and 18. The anchor block 38 is spaced rearward of the front wall 12 and a dispensing block 40 is disposed between the anchor block 38 and the front wall 12 for oscillation toward and away from the side walls 16 and 18.

A guide shaft 42 has one end thereof supported from the side wall 16 within a recess 44 provided therefor and the other end of the guide shaft 42 is loosely slidably received within a blind bore 46 formed within the adjacent end of the dispensing block 40, a compression spring 48 being disposed about the guide shaft 42 between side wall 16 and the inner end of the blind bore 46. In this manner, the compression spring 48 yieldingly biases the dispensing block 40 to the right slightly past the solid line position shown in FIG. 3. The upper surface 50 of the dispensing block 40 is substantially horizontally aligned with the upper surface 52 of the anchor block 38 while the lower end portion 54 of the inclined wall 30 is spaced slightly above the upper surfaces of the blocks 38 and 40.

The block 40 includes an upwardly opening dispensing groove 56 formed therein which is open at its end adjacent the side wall 16 and which is closed at its end adjacent the side wall 18 by means of a disk 58 secured to that end of the block 40, the inner surface of the end wall 18 being relieved as at 60 to receive the disk 58 therein when the compression spring 48 yieldingly biases the dispensing block 40 toward its limit position away from the side wall 16.

Figure 4:
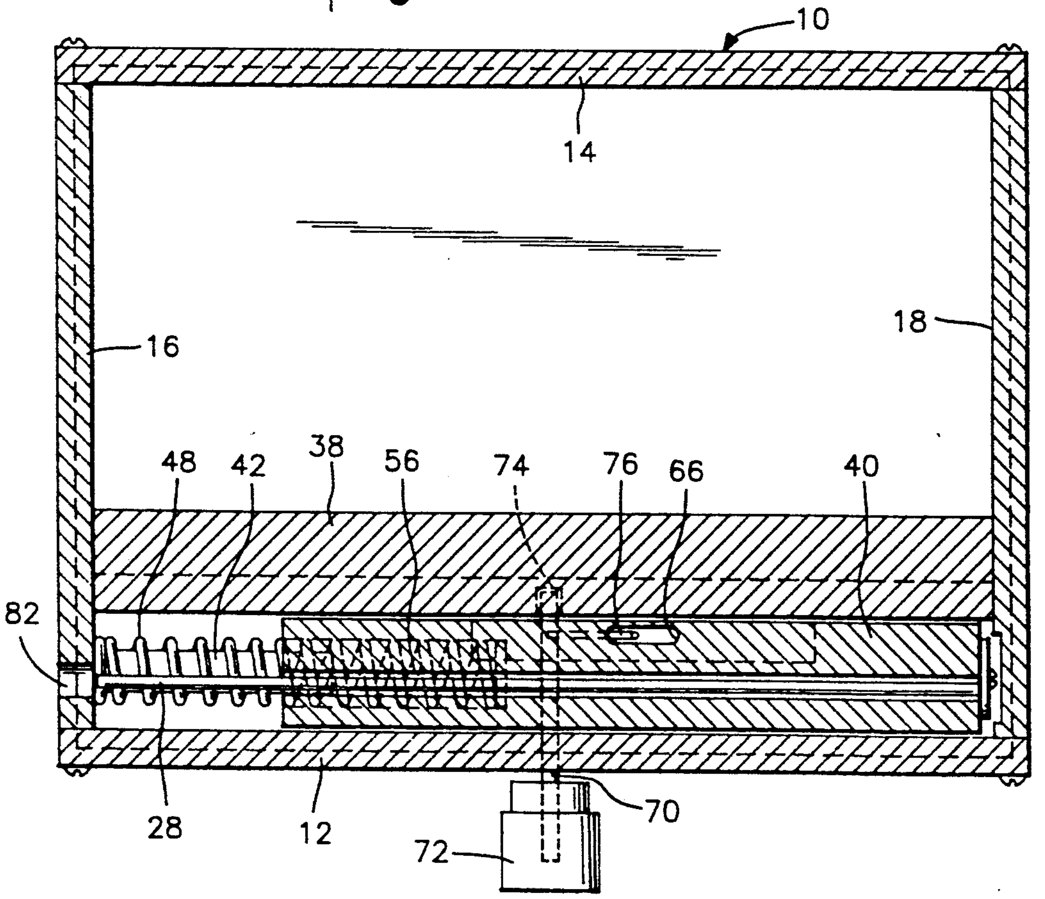
FIG. 4 is an enlarged horizontal sectional view taken substantially upon the plane indicated by the section 4—4 of FIG. 2.

The longitudinal central portion of the dispensing block 40 includes a void 62 formed therein and including a lower portion extending lengthwise of the block 40 and opening forward through the front side thereof. In addition, the void 62 includes an upstanding portion 64 spaced rearward of the front side of the dispensing block 40 and which opens upwardly through the upper surface 50 as at 66, see FIG. 4, throughout a restricted length of the longitudinal central area of the dispensing block 40.

The front wall 12 has a bore 68 formed therethrough and an operating shaft or rod 70 is rotatably received the bore 68 and has an operating knob 72 on its outer end. The inner terminal end of the rod or shaft 70 extends through the void 62 and is rotatably received within a forwardly opening blind bore 74 formed in the anchor block 38 and that portion of the rod or shaft 70 extending through the upstanding portion 64 of the void 62 has an operating arm 76 mounted thereon which extends upwardly through the void and to a level slightly above the upper surface 50 when the arm 76 is vertically disposed.

Figure 3:
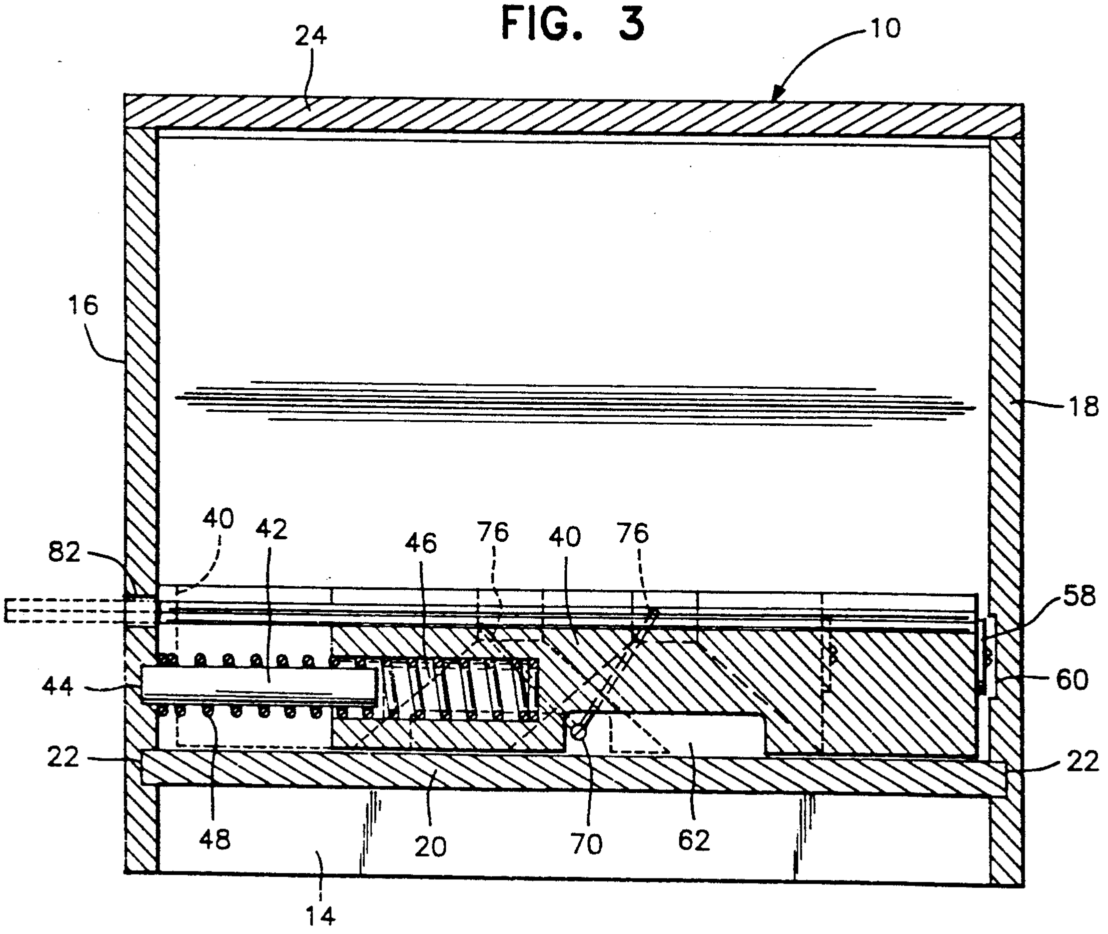
FIG. 3 is a vertical sectional taken substantially upon the plane indicated by the section line 3—3 of FIG. 2.
Figure 2:
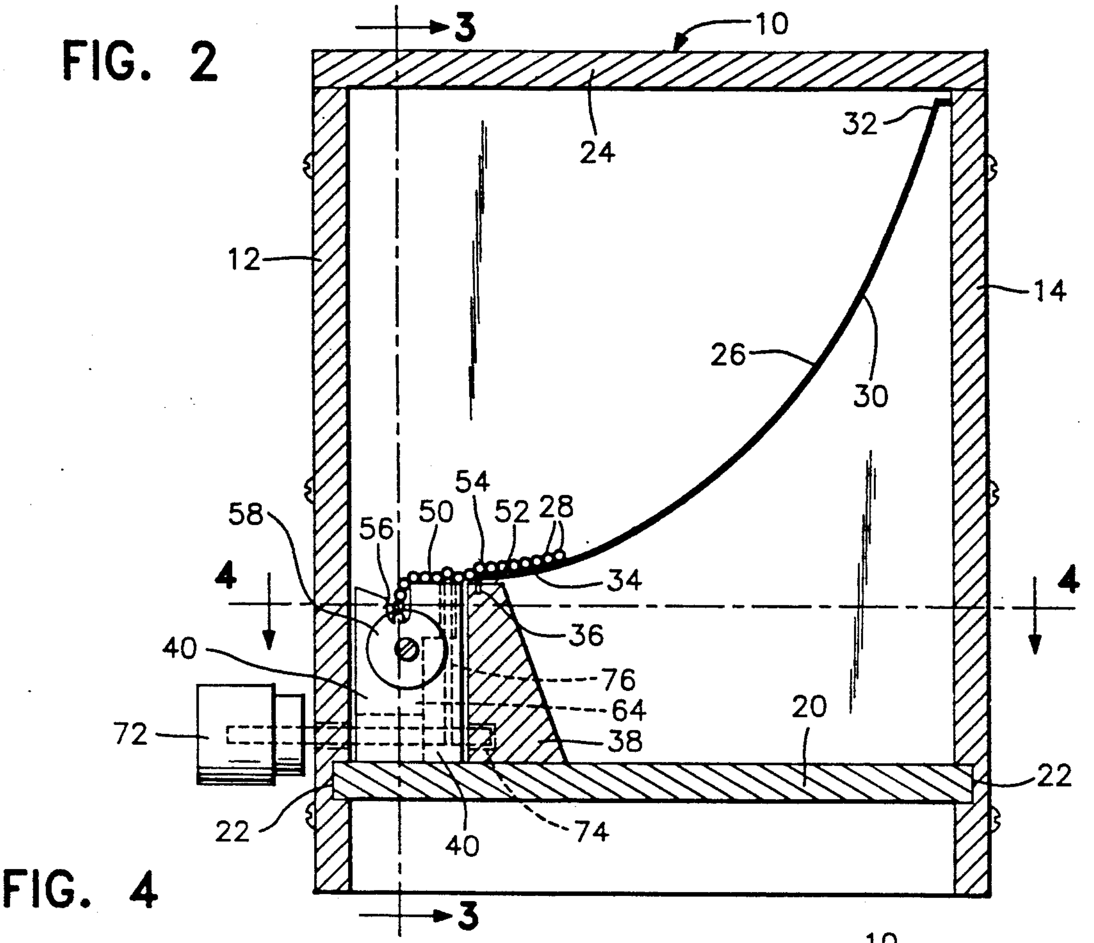
FIG. 2 is an enlarged vertical sectional view of the article dispenser taken substantially upon the plane indicated by the section line 2—2 of FIG. 1.

Because of the limited longitudinal extent of the opening of the void 62 upwardly through the longitudinal central portion of the dispensing block 40, oscillation of the shaft or rod 70 by the knob 72 will cause oscillation of the dispensing block 40 between the substantially fully retracted position thereof illustrated in FIG. 3 and the dotted line position thereof illustrated in FIG. 3.

In operation, when the elongated members, articles or coffee stirrers move downwardly along the inclined wall 30 toward the lower end 54 thereof, the coffee stirrer at the lower end of the inclined wall 30 tends to drop partially thereoff and onto the upper surface 50 of the dispensing block 40 and coffee stirrers disposed forwardly thereof rest upon the upper surface 50 and are urged forwardly therealong by the forward lateral pressure applied thereto as the coffee stirrers 28 further upwardly along the inclined wall slide downwardly therealong by gravity. Then, as a stirrer reaches the groove 56, it falls downwardly into the groove 56 as well as the next stirrer. Inasmuch as the stirrers move from the lower end 54 of the inclined wall 30 across the upper surface 50 of the dispensing block 40 toward the dispensing groove 56, they are substantially disposed in parallel relation for proper successive dropping into the dispensing groove 56.

Assuming that a stirrer is properly disposed in the bottom of the groove 56, the knob 72 is rotated in the direction of the arrow 80 on the front wall 12, see FIG. 1, in order to shift the dispensing block 40 from its substantially fully retracted position illustrated in solid lines in FIG. 3 of the drawings to the phantom line showing thereof in FIG. 3 where upon the left hand end of the coffee stirrer or elongated article 28 seated in the bottom of the groove 56 is dispensed outwardly through the opening 82 formed in the side wall 16 in alignment with the lower portion of the groove 56. Of course, the full length of the elongated article or coffee stirrer 28 is not dispensed through the opening 82. Rather, only a short end portion thereof is dispensed through the opening 82 sufficient for a person to grasp the extended end of the elongated article or coffee stirrer and withdraw the latter to the left as viewed in FIG. 3. As the knob 72 is released after being turned counterclockwise to dispense an elongated article or coffee dispenser 28, the spring 48 automatically returns the dispensing block 40 to and past the substantially fully retracted position thereof illustrated in solid lines in FIG. 3 where upon the next article to be dispensed will fall down into and be fully seated within the dispensing groove 56. Also, upon return of the dispensing block 40 to the retracted position thereof, the upper terminal end of the arm 76 agitates the elongated article 28 in registry with the upper extremity of the void 62 in order to insure full parallel relationship of the articles moving forward across the upper surface 50 of the dispensing block 40. Of course, the upper extremity of the arm 76 agitates the elongated article 28 registered with the upper extremity of the void 62 both during movement of the dispensing block 40 to the left as viewed in FIG. 3 when dispensing an article 28 and also during movement of the dispensing block 40 to the right as viewed in FIG. 3 in order that the next article 28 may be fully received and seated within the groove 56.

The foregoing is considered a illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A dispenser for elongated articles, said dispenser including a housing defining an internal hopper portion for receiving therein a plurality of said articles in parallel relation, said hopper including an inclined wall against and downwardly along which said articles rest and move by gravity, said housing including opposite side walls, one of said side walls having a dispensing opening therein, a dispensing block having an upper surface and mounted in said housing and movable toward and away from said one side wall and including an upwardly opening groove for receiving one of said articles therein, the end of said groove remote from said one side wall being closed, said block being operative, when having an article received in said groove and moved toward said one side wall, to partially lengthwise dispense said article through said dispensing opening, said inclined wall having a lower end portion, said groove being generally horizontally registered with said lower end portion of said inclined wall, said housing including a front wall closing the front of said housing between said side walls and having a centrally located bore formed therethrough, said dispensing block having an upstanding void therein extending upwardly from a position in alignment with said bore and opening through said upper surface of said block between said lower end portion and said groove and with the portion of said void opening upwardly through said surface being of a restricted length along a path extending between said side walls, an operating rod extending through and oscillatable in said bore and including an upwardly projecting arm disposed in said void and projecting upwardly therethrough when said rod is upright, said rod being oscillatable to effect oscillation of said block toward and away from said one side wall and to agitate an elongated article disposed between said lower end portion and said groove and registered with said void.

2. The dispenser of claim 1 including an anchor block mounted within said housing between said side walls and in horizontal registry with said dispensing block and being disposed on the side of said dispensing block remote from said front wall, said anchor block including a journal bore therein axially aligned with said rod, said rod extending through said dispensing block and being journaled in said bore.

3. The dispenser of claim 2 wherein said lower end portion of said inclined wall is supported from said anchor block.

4. The dispenser of claim 3 wherein said inclined wall comprises a curved wall whose upper end portion is more closely vertically disposed than said lower end portion.

5. The dispenser of claim 4 wherein the lower end portion of said curved inclined wall is only slightly downwardly inclined toward said front wall.

6. The dispenser of claim 1 wherein said one wall includes a guide shaft supported and projecting inwardly therefrom, said dispensing block including a blind bore in which the end of said guide shaft remote from said one side wall is slidingly received, and a compression spring disposed about said guide shaft betwee said one wall and the adjacent end of said dispensing block yieldingly biasing the latter away from said one side wall.

7. The dispenser of claim 1 wherein said inclined wall comprises a curved wall whose upper end portion is more closely vertically disposed than said lower end portion.

8. The dispenser of claim 7 wherein the lower end portion of said curved inclined wall is only slightly downwardly inclined toward said front wall.

9. The dispenser of claim 8 wherein said one wall includes a guide shaft supported and projecting inwardly therefrom, said dispensing block including a blind bore in which the end of said guide shaft remote from said one side wall is slidingly received, and a compression spring disposed about said guide shaft between said one wall and the adjacent end of said dispensing block yielding biasing the latter away from said one side wall.

10. A dispenser for elongated articles, said dispenser including a housing defining an internal hopper portion for receiving therein a plurality of said articles in horizontal parallel relation, said hopper portion including an inclined wall defining a lower margin and against and downwardly along which said articles rest and move by gravity toward said lower margin, said housing including a front wall and at least one side wall extending rearwardly from said front wall, a dispensing block in said housing closely rearward of said front wall and rectilinearly shiftable in said housing toward and away from said one side wall, said dispensing block including an upwardly opening groove formed therein, said one side wall including a dispensing opening therethrough registered with groove, said dispensing block including an upper surface upwardly through which said groove opens and substantially horizontally registered with said lower margin of said inclined wall, oscillatably mounted actuator means carried by said front wall and operably associated with said dispensing block for back and forth shifting of said block in response to oscillation of said actuator means, said elongated articles being movable downwardly along said inclined wall and onto said upper surface for subsequent dropping into said groove, and agitator means shiftably mounted in said housing and with which said actuator means is operatively associated and operable to slightly upwardly displace and agitate the midportion of an elongated member during its movement from the lower marginal portion of said inclined wall toward said groove in response to oscillation of said actuator means.

11. The dispenser of claim 10 wherein said actuator means comprises an actuating know disposed forward of said front wall and supported therefrom for oscillation relative thereto.

12. The dispenser of claim 11 wherein said inclined wall comprises a curved wall whose upper end portion is more closely vertically disposed than the lower end portion thereof.

13. The dispenser of claim 12 wherein the lower end portion of said curved inclined wall is only slightly downwardly inclined toward said front wall.

* * * * *